United States Patent
Jung

(10) Patent No.: US 10,205,136 B2
(45) Date of Patent: Feb. 12, 2019

(54) SECONDARY BATTERY

(71) Applicant: Samsung SDI Co., Ltd., Yongin-si, Gyeonggi-do (KR)

(72) Inventor: Kangkook Jung, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 148 days.

(21) Appl. No.: 14/848,953

(22) Filed: Sep. 9, 2015

(65) Prior Publication Data

US 2016/0079575 A1    Mar. 17, 2016

(30) Foreign Application Priority Data

Sep. 17, 2014   (KR) .................. 10-2014-0123699

(51) Int. Cl.
*H01M 2/02*   (2006.01)
*H01M 2/08*   (2006.01)

(52) U.S. Cl.
CPC ......... *H01M 2/0217* (2013.01); *H01M 2/021* (2013.01); *H01M 2/0275* (2013.01); *H01M 2/0277* (2013.01); *H01M 2/0285* (2013.01); *H01M 2/0287* (2013.01); *H01M 2/08* (2013.01); *H01M 2220/30* (2013.01)

(58) Field of Classification Search
CPC .... H01M 2/075; H01M 2/021; H01M 2/0207; H01M 2/0217; H01M 2/0277; H01M 2/0285; H01M 2/0287; H01M 2/08; H01M 2220/30

See application file for complete search history.

(56) References Cited

U.S. PATENT DOCUMENTS

| | | | |
|---|---|---|---|
| 2003/0108787 A1 | 6/2003 | Endo et al. | |
| 2003/0186122 A1* | 10/2003 | Xing | H01M 2/021 429/185 |
| 2005/0164080 A1* | 7/2005 | Kozu | H01M 2/105 429/176 |
| 2006/0263681 A1 | 11/2006 | Lee | |
| 2007/0020516 A1 | 1/2007 | Yoon | |
| 2008/0096105 A1 | 4/2008 | Lee | |
| 2008/0286644 A1* | 11/2008 | Yeo | G09F 3/02 429/122 |

(Continued)

FOREIGN PATENT DOCUMENTS

| | | | |
|---|---|---|---|
| JP | 10162802 A | * | 6/1998 |
| KR | 10-2002-0077388 A | | 10/2002 |

(Continued)

OTHER PUBLICATIONS

J-PlatPat Machine Translation of the detailed description of JP 10162802A. (Year: 1998).*

(Continued)

*Primary Examiner* — Gregg Cantelmo

(74) *Attorney, Agent, or Firm* — Knobbe Martens Olson & Bear LLP

(57) ABSTRACT

A secondary battery is disclosed. In one aspect, the secondary battery includes an electrode assembly and an exterior member accommodating the electrode assembly. The exterior member includes a flexible pouch portion and a can portion connected to the pouch portion and formed of a material having a greater hardness than that of the pouch portion.

22 Claims, 9 Drawing Sheets

(56) References Cited

U.S. PATENT DOCUMENTS

| | | | |
|---|---|---|---|
| 2011/0086262 A1* | 4/2011 | Kim | H01M 2/0212 429/178 |
| 2011/0159328 A1* | 6/2011 | Yeo | H01M 2/0212 429/94 |
| 2011/0250475 A1* | 10/2011 | Yamamoto | H01M 2/0277 429/7 |
| 2012/0009443 A1 | 1/2012 | Baek et al. | |
| 2012/0015217 A1 | 1/2012 | Lee et al. | |
| 2012/0219847 A1* | 8/2012 | Hong | H01M 2/021 429/163 |

FOREIGN PATENT DOCUMENTS

| | | |
|---|---|---|
| KR | 20030096718 A * | 12/2003 |
| KR | 10-2007-0011654 A | 1/2007 |
| KR | 10-2013-0130464 A | 12/2013 |

OTHER PUBLICATIONS

Extended European Search Report dated Jan. 27, 2016 for European Patent Application No. EP 15 185 740.6, which shares priority of Korean Patent Application No. KR 10-2014-0123699 with subject U.S. Appl. No. 14/848,953, and cites the above-identified references numbered 1-4.

* cited by examiner

SECONDARY BATTERY

CROSS-REFERENCE TO RELATED APPLICATIONS

This application claims the benefit of Korean Patent Application No. 10-2014-0123699, filed on Sep. 17, 2014, in the Korean Intellectual Property Office, the disclosure of which is incorporated herein in its entirety by reference.

BACKGROUND

Field

The described technology generally relates to a secondary battery.

Description of the Related Technology

Unlike primary batteries which cannot be recharged, secondary batteries can be repeatedly recharged. This allows them to be economical and environment-friendly. Types of portable electronic devices can vary, and their design has become an important factor in determining a consumer's purchase of the electronic devices.

For example, various wearable computer technologies which use secondary batteries as a power supply source have been developed and released. Also, electronic devices such as mobile phones and laptop computers have predetermined curved surfaces for an ergonomic design.

SUMMARY OF CERTAIN INVENTIVE ASPECTS

One inventive aspect is a secondary battery.

Another aspect is a secondary battery that includes: an electrode assembly; and an exterior member which seals the electrode assembly. The exterior member includes: a pouch portion which is flexible; and a can portion which is connected to the pouch portion and is formed of a material having a greater hardness than that of the pouch portion.

The pouch portion and the can portion can be thermal-bonded and connected to each other.

The can portion can form at least one of side surfaces of the exterior member.

The can portion can be bent to surround side surfaces of the electrode assembly.

The can portion can be arranged in a center portion of the exterior member.

The exterior member can be curved to have at least one radius of curvature.

The pouch portion can include: a first sealing portion; a pouch body which is connected to the first sealing portion; and a second sealing portion which is arranged to face the first sealing portion and is connected to the pouch body.

Each of the first sealing portion and the second sealing portion can be vertically connected to the pouch body.

A width of the first sealing portion can be different from a width of the pouch body.

The width of the first sealing portion can be greater than the width of the pouch body.

The can portion can be inserted into the pouch body and can be connected to the first sealing portion, the second sealing portion, and the pouch body.

The can portion can be arranged in a space formed by the first sealing portion, the second sealing portion, and the pouch body and can be connected to the first sealing portion, the second sealing portion, and the pouch body.

At least one of an end of the first sealing portion and an end of the second sealing portion can protrude from an end of the can portion.

A plurality of can portions can be formed, and the plurality of can portions can be spaced apart from each other and can be connected to the pouch body.

Another aspect is a secondary battery that includes: an electrode assembly; and an exterior member which includes a first exterior member and a second exterior member. The first exterior member and the second exterior member are connected to each other and seal the electrode assembly, and at least one of the first exterior member and the second exterior member includes: a pouch portion which is flexible; and a can portion which is connected to the pouch portion and is formed of a material having a greater hardness than the pouch portion.

The at least one of the first exterior member and the second exterior member can be formed of a flexible material.

The pouch portion and the can portion can be thermal-bonded and connected to each other.

The can portion can form at least one side of the exterior member.

The can portion can be arranged at a center of the exterior member.

The exterior member can be curved due to curvature having at least one radius of curvature.

Another aspect is a secondary battery comprising an electrode assembly and an exterior member accommodating the electrode assembly. The exterior member comprises a flexible pouch portion and a can portion connected to the pouch portion and formed of a material having a greater hardness than that of the pouch portion.

In the above battery, the pouch portion and the can portion are thermally bonded to each other.

In the above battery, the can portion forms at least one of side surfaces of the exterior member. In the above battery, the can portion is bent so as to surround side surfaces of the electrode assembly.

In the above battery, the can portion is located in a center portion of the exterior member. In the above battery, the exterior member is curved.

In the above battery, the pouch portion comprises a first sealing portion, a pouch body connected to the first sealing portion, and a second sealing portion facing the first sealing portion and connected to the pouch body.

In the above battery, each of the first and second sealing portions is connected to the pouch body in a lengthwise direction of the pouch body.

In the above battery, the width of the first sealing portion is different from the width of the pouch body. In the above battery, the width of the first sealing portion is greater than the width of the pouch body.

In the above battery, the can portion is inserted into the pouch body and connected to the first and second sealing portions, and the pouch body.

In the above battery, the can portion is arranged in a space formed by the first and second sealing portions, and the pouch body, wherein the can portion is connected to the first and second sealing portions, and the pouch body.

In the above battery, at least one of an end of each of the first and second sealing portions protrudes from an end of the can portion.

In the above battery, the can portion comprises a plurality of can portions, wherein the can portions are spaced apart from each other and connected to the pouch body.

Another aspect is a secondary battery comprising an electrode assembly and an exterior member comprising first and second exterior members connected to each other and accommodating the electrode assembly. At least one of the first and second exterior members comprises a flexible pouch portion and a can portion connected to the pouch portion and formed of a material having a greater hardness than the pouch portion.

In the above battery, the at least one of the first and second exterior members is formed of a flexible material.

In the above battery, the can portion forms at least one side of the exterior member. In the above battery, the can portion is located at a center of the exterior member.

In the above battery, the exterior member is curved.

Another aspect is a secondary battery comprising an electrode assembly, a flexible pouch portion accommodating a middle portion of the electrode assembly, and a can portion connected to the pouch portion and accommodating side portions of the electrode assembly, wherein the can portion is formed of a material having a greater hardness than that of the pouch portion.

DETAILED DESCRIPTION OF CERTAIN INVENTIVE EMBODIMENTS

Figure 1:
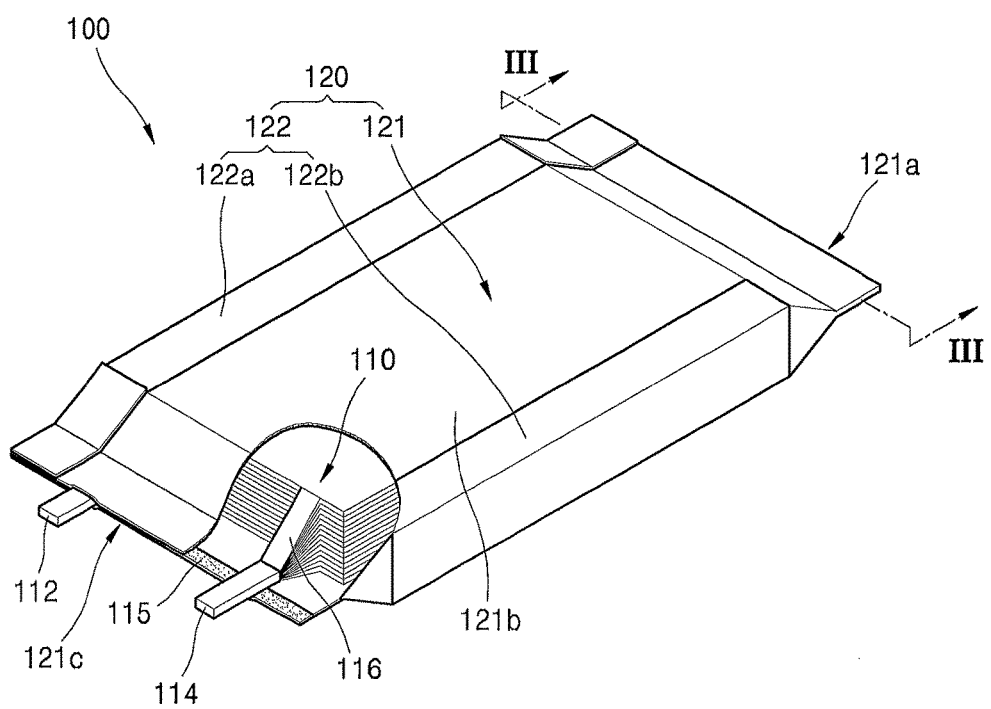
FIG. 1 is a perspective view of a secondary battery according to an embodiment.

The shape of secondary batteries for use in electronic devices needs to be changed in various ways according to the shape of the electronic device. For example, if the electronic device is bent, the battery must be bent also.

The described technology will now be described more fully with reference to the accompanying drawings, in which exemplary embodiments are shown. The described technology can, however, be embodied in many different forms and should not be construed as being limited to the embodiments set forth herein; rather, these embodiments are provided so that this disclosure will be thorough and complete, and will fully convey the concept of the described technology to those skilled in the art. In the drawings, the thicknesses of layers and regions are exaggerated for clarity. The terms used in the present specification are merely used to describe particular embodiments, and are not intended to limit the described technology. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof can exist or can be added. While such terms as "first", "second", etc., can be used to describe various components, such components must not be limited to the above terms. The above terms are used only to distinguish one component from another. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 2:
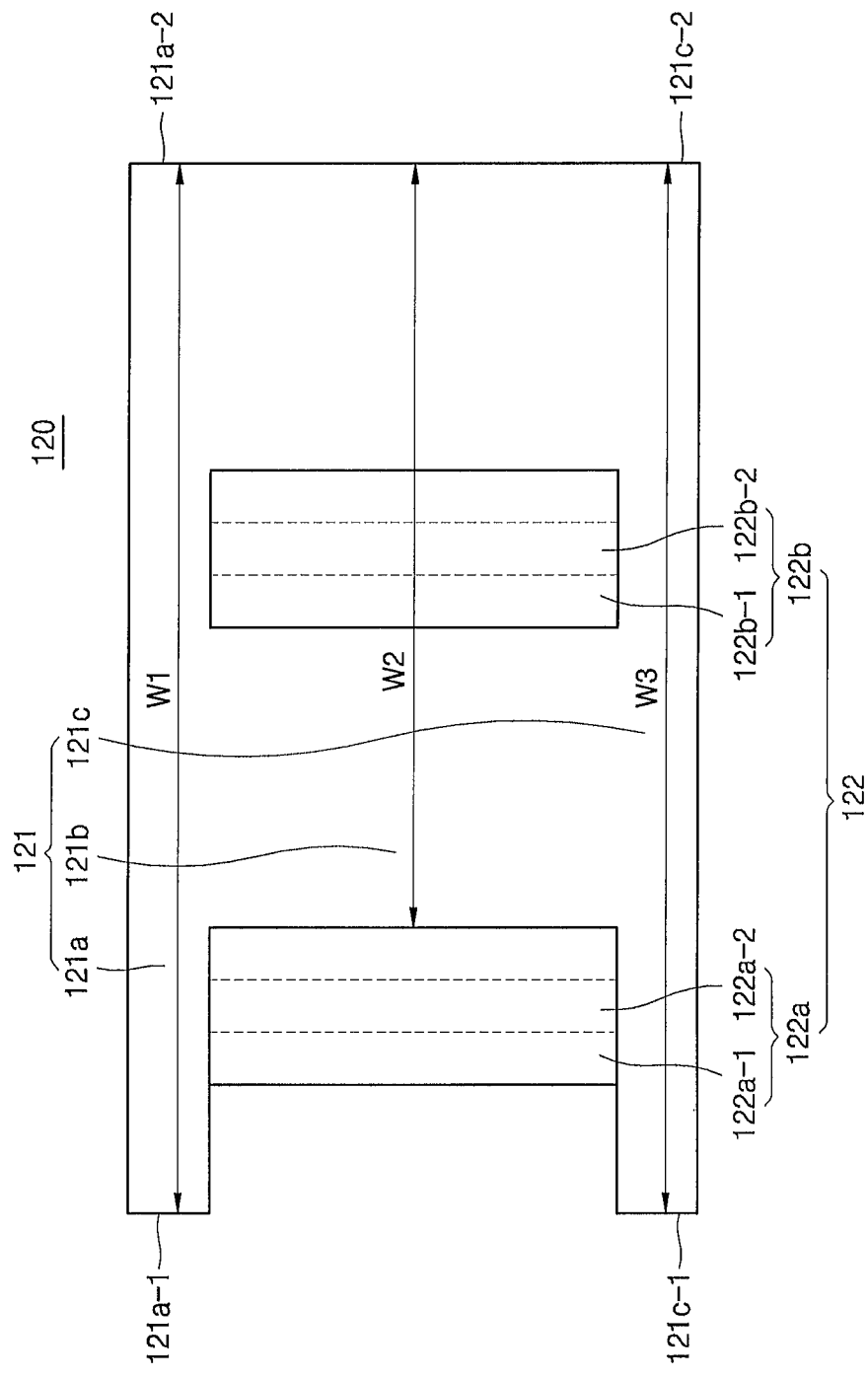
FIG. 2 is a development view of an exterior member of FIG. 1.
Figure 3:
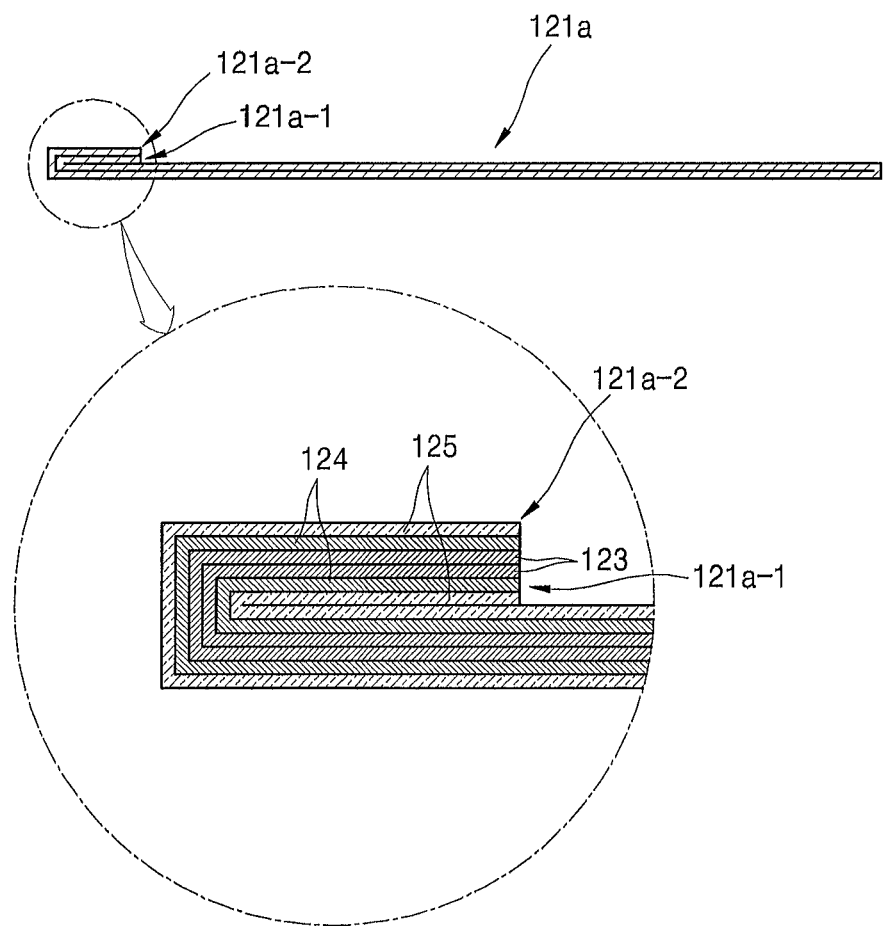
FIG. 3 is a cross-sectional view taken along a line of FIG. 1.

FIG. 1 is a perspective view of a secondary battery 100 according to an embodiment. FIG. 2 is a development view of an exterior member 120 of FIG. 1. FIG. 3 is a cross-sectional view taken along a line of FIG. 1.

Referring to FIGS. 1 through 3, the secondary battery 100 includes an electrode assembly 110 and an exterior member 120 sealing the electrode assembly 110.

The electrode assembly 110 can include a positive electrode plate, a negative electrode plate, and a separator interposed therebetween. The positive electrode plate, the separator, and the negative electrode plate can be sequentially stacked to form the electrode assembly 110.

The positive electrode plate can include a positive active material portion which is coated with a positive active material and a positive non-coated portion which is not coated with the positive active material. The positive active material portion is formed by coating, for example, a portion of at least one surface of an aluminum (Al) plate with the positive active material. The other non-coated portion of the surface of the aluminum plate can be the positive non-coated portion. The positive active material can be a lithium-containing transition metal oxide such as lithium cobalt oxide ($LiCoO_2$), lithium nickel oxide ($LiNiO_2$), lithium manganese oxide ($LiMnO_2$), and lithium permanganate ($LiMnO_4$), a lithium-chalcogenide compound or a combination thereof.

The negative electrode plate can include a negative active material portion which is coated with a negative active material and a negative non-coated portion which is not coated. The negative active material portion can be formed by coating, for example, a portion of at least one surface of a copper (Cu) plate with the negative active material. The other non-coated portion of the surface of the copper plate can be the negative non-coated portion. The negative active material can be a carbon material such as crystalline carbon, amorphous carbon, a carbon composite, and carbon fiber, a lithium metal, a lithium alloy or a combination thereof.

The separator can be manufactured by coating at least of polyethylene (PE), polystyrene (PS), polypropylene (PP), and a co-polymer including PE and PP with a polyvinylidene fluoride-hexafluoropropylene (PVDF-HFP) co-polymer, but is not limited thereto.

A first electrode tab 112 and a second electrode tab 114 can be electrically connected to the electrode assembly 110. In some embodiments, collectors 116 are respectively attached to the positive non-coated portion and the negative non-coated portion and can be connected to the first electrode tab 112 or the second electrode tab 114. The first and second electrode tabs 112 and 114 are at least partially exposed to the environment by penetrating a sealing unit 115 to which the exterior member 120 is attached. The electrode assembly 110 can be charged or discharged through the first and second electrode tabs 112 and 114.

The shape of the exterior member 120 can vary. For example, a single exterior member 120 is formed, or a plurality of exterior members 120 is formed. Hereinafter, a case where one exterior member 120 is formed will be described in detail for convenience of description, but the shape is not limited thereto.

The exterior member 120 can include a pouch portion 121 which is flexible and a can portion 122 which is connected to the pouch portion 121 and formed of a material having a greater hardness than that of the pouch portion 121. In this case, the pouch portion 121 can include first insulating layers 123, metal layers 124, and second insulating layers 125 which are sequentially stacked. In some embodiments, the first insulating layers 123 and the second insulating layers 125 are formed of PP, polyethylene terephthalate (PET), nylon, etc., and the metal layers 124 are formed of Al, steel, stainless steel, etc. The pouch portion 121 can be variously formed. For example, the pouch portion 121 has a trilayer structure in which the first insulating layers 123 formed of PP, the metal layers 124 formed of Al, and the second insulating layers 125 formed of PET are stacked.

The pouch portion 121 can include a first sealing portion 121a, a pouch body 121b, and a second sealing portion 121c. In this case, the first sealing portion 121a, the pouch body 121b, and the second sealing portion 121c can include the first insulating layers 123, the metal layers 124, and the second insulating layers 125 which are described above.

As described above, the can portion 122 can be formed of a material having a greater hardness than that of the pouch portion 121. For example, the can portion 122 is formed of a metal such as Al or an Al alloy.

The pouch portion 121 and the can portion 122 can be connected to each other through a thermal bonding process. For example, the pouch portion 121 and the can portion 122 can be connected to each other through a usual thermal bonding process by applying heat ranging from about 1500 to about 2000° C. for about 1 to about 5 seconds at a pressure ranging from about 0.1 to about 0.5 MPa by using a sealing apparatus.

Figure 9:
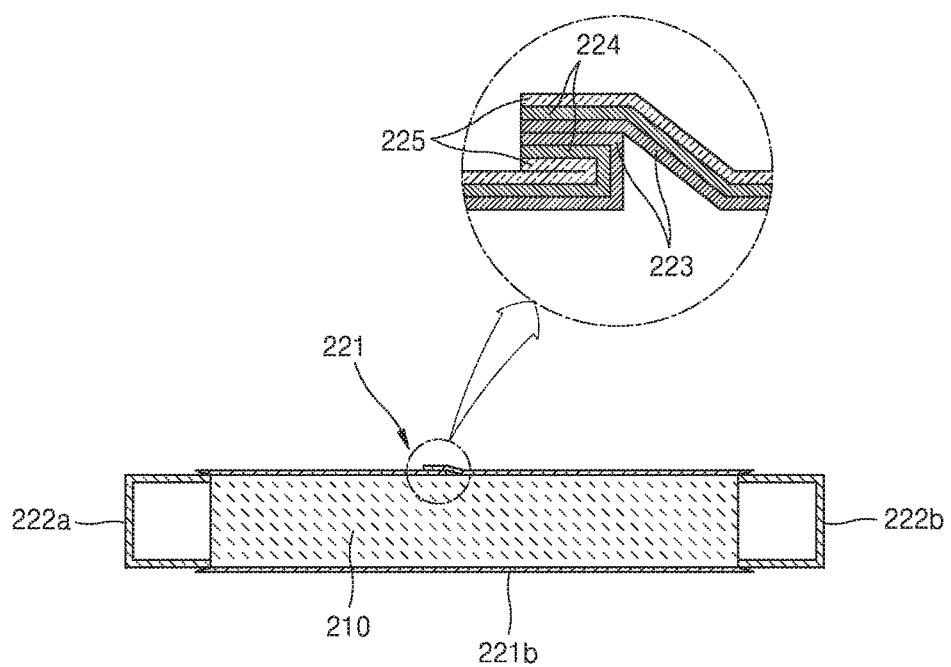
FIG. 9 is a cross-sectional view of a secondary battery according to another embodiment.

The pouch 121 and the can 122 can be connected to each other by using various methods. For example, the pouch 121 is substantially rectangular, and the can 122 is inserted into the pouch 121 (see FIG. 9). In this case, as described above, the pouch 121 can be connected to the can 122 through the thermal bonding process as described above. In addition, the pouch 121 can be formed as a shape 'l' (refer to FIG. 5) or '[' (refer to FIG. 2). In this case, the can 122 can be installed in a center portion of the pouch 21 or inside the pouch 121. However, the pouch 121 is not limited to the above and can have various shapes. Hereinafter, a case where the pouch 121 is formed in the shape '[' will be described in detail for convenience of description, but the shape is not limited thereto.

A plurality of can portions 122 can be included in the exterior member 120, spaced apart from each other, and connected to each other by the pouch portion 121. In this regard, a single pouch portion 121 or a plurality of pouch portions 121 can be formed. In some embodiments, if the pouch portions 121 are included in the exterior member 120, the can portions 122 and the pouch portions 121 are alternately arranged, and the pouch portions 121 are respectively connected to the can portions 122 in order to surround a portion of an exterior surface of each of the can portions 122. In this case, the pouch portions 121 can be longer than the can portions 122.

Hereinafter, a case where one pouch portion 121 is included in the exterior member 120 and is formed in the shape '[' and two can portions 122 are included in the exterior member 120 will be described in detail for convenience of description, but they are not limited thereto.

The pouch portion 121 can include the first sealing portion 121a, the pouch body 121b, and the second sealing portion 121c. In this case, the can portion 122 can include a first can portion 122a which is installed in a space formed by the first sealing portion 121a, the pouch body 121b, and the second sealing portion 121c, and a second can portion 122b which is installed inside the pouch body 121b.

Upon reviewing a method of manufacturing the secondary battery 100 by using the exterior member 120, the pouch portion 121 and the can portion 122 are respectively formed and thermal-bonded to each other, and thus one exterior member 120 can be manufactured. Also, during the manufacture of the exterior member 120, the above-described electrode assembly 110 can be manufactured.

When the above process is completed, the exterior member 120 is bent, and a space can be formed in the exterior member 120. The methods of bending the exterior member 120 can vary. For example, the space is formed by applying pressure to a portion of the exterior member 120 such that the portion can be bent. In this case, at least one of the first can portion 122a and the second can portion 122b can be arranged in a bent portion of the exterior member 120. For example, the first can portion 122a is arranged in the bent portion of the exterior member 120. As another example, the second can portion 122b is arranged in the bent portion of the exterior member 120. As another example, the first can portion 122a and the second can portion 122b are arranged in the bent portion of the exterior member 120. In this case, the first can portion 122a and the second can portion 122b face each other. Hereinafter, a case where the first can portion 122a and the second can portion 122b are arranged to face each other in the bent portion of the exterior member 120 will be described in detail for convenience of description.

If the exterior member 120 is bent, the first can portion 122a and the second can portion 122b can be bent. In this case, the first can portion 122a can include first bending portions 122a-1 formed to be bent and a first can body portion 122a-2 connected to the first bending portions 122a-1 and forming a side surface of the secondary battery 100. A pair of first bending portions 122a-1 are formed and can be arranged to face each other on both sides of the first can body portion 122a-2 with respect to the first can body portion 122a-2.

Like the first can portion 122a, the second can portion 122b can include second bending portions 122b-1 and a second can body portion 122b-2. In this case, a pair of second bending portions 122b-1 can exist and can be arranged to face each other on both sides of the second can body portion 122b-2 with respect to second can body portion 122b-2.

If the first can portion 122a and the second can portion 122b are bent, each first bending portion 122a-1 and each second bending portion 122b-1 can be arranged on the same plane. Also, the first can body portion 122a-2 and the second can body portion 122b-2 can be arranged to face each other. In this case, an overall shape of the exterior member 120 can be similar to a substantially rectangular pillar.

After the above-described process is completed, each portion of the pouch portion 121 and the can portion 122 are thermal-bonded, and thus an exterior surface of the exterior member 120 can have a closed-loop shape. In this case, both ends of the first sealing portion 121a can be thermal-bonded.

Also, the pouch body 121b and the first can portion 122a can be thermal-bonded. Both ends of the second sealing portion 121c can be thermal-bonded.

The first sealing portion 121a can include a first bonding portion 121a-1 forming one end of the first sealing portion 121a and a second bonding portion 121a-2 forming another end thereof. In this case, the first bonding portion 121a-1 can protrude beyond an end of the first can portion 122a toward the outside.

In this case, the width W1 of the first sealing portion 121a and the width W3 of the second sealing portion 121c can be different from the width W2 of the pouch body 121b. For example, each of the width W1 and the width W3 is greater than the width W2, thereby sufficiently securing a length used to fold and bend the first sealing portion 121a and the second sealing portion 121c when the pouch body 121b is bonded to the first can portion 122a.

Referring to FIG. 3, the first bonding portion 121a-1 and the second bonding portion 121a-2 are connected to each other through thermal bonding. In some embodiments, when the first and second bonding portions 121a-1 and 121a-2 are thermal-bonded, one of the portions 121a-1 and 121a-2 is folded to overlap the same surface. For example, the first bonding portion 121a-1 is folded such that the first insulating layers 123 of the first bonding portion 121a-1 contact each other or the second insulating layers 125 of the first bonding portion 121a-1 contact each other. Also, the second bonding portion 121a-2 can be folded such that the first insulating layers 123 of the second bonding portion 121a-2 contact each other or the second insulating layers 125 of the second bonding portion 121a-2 contact each other. In this case, when one of the first and second bonding portions 121a-1 and 121a-2 is folded to allow the first insulating layers 123 to contact each other, the second insulating layers 125 of the first bonding portion 121a-1 or the second insulating layers 125 of the second bonding portion 121a-2 is arranged in a space in which the exterior member 120 is formed. On the other hand, when one of the first and second bonding portions 121a-1 and 121a-2 is folded to allow the second insulating layers 125 to contact each other, the first insulating layers 123 of the first bonding portion 121a-1 or the first insulating layers 123 of the second bonding portion 121a-2 can be at least partially exposed to the outside the space in which the exterior member 120 is formed. Hereinafter, a case where the first bonding portion 121a-1 is folded such that the second insulating layers 125 of the first bonding portion 121a-1 contact each other will be described in detail for convenience of description.

When the first bonding portion 121a-1 is folded, the second insulating layers 125 of the first bonding portion 121a-1 can contact each other. In this case, the first insulating layers 123 of the first bonding portion 121a-1 can be at least partially exposed to the outside. As described above, when the first bonding portion 121a-1 is folded, the second bonding portion 121a-2 is arranged to correspond to the first bonding portion 121a-1 and then thermal-bonded. In this case, the first insulating layers 123 of the first bonding portion 121a-1 that are at least partially exposed to the environment are arranged to correspond to the first insulating layers 123 of the second bonding portion 121a-2 and then thermal-bonded. The second insulating layers 125 of the first bonding portion 121a-1 can contact each other and can be thermal-bonded. In that case, the first insulating layers 123 of the first bonding portion 121a-1 and the first insulating layers 123 of the second bonding portion 121a-2 are thermal-bonded and bonded to each other by using the same or similar materials. Thus, the first bonding portion 121a-1 and the second bonding portion 121a-2 have a good bonding force, and a thermal expansion coefficient is substantially the same. Furthermore, a separation, etc. caused by thermal expansion on a bonded interface of the first bonding portion 121a-1 and the second bonding portion 121a-2 can be effectively prevented. Also, since the second insulating layers 125 of the first bonding portion 121a-1 are formed of the same material, a good bonding force can be secured when thermal bonding process is performed.

When the above process is being performed or is completely performed, portions of the first sealing portion 121a other than the first and second bonding portions 121a-1 and 121a-2 can be bonded in a lengthwise direction. When the first bonding portion 121a-1 is bonded to the second bonding portion 121a-2, since the first sealing portion 121a is configured as a closed circuit, surfaces of the first sealing portion 121a facing each other in a lengthwise direction of the first sealing portion 121a can be thermal-bonded to each other.

When the bonding of the first sealing portion 121a is performed, the pouch body 121b and the first can portion 122a can be thermal-bonded to each other. In this regard, a bonding method is the same or similar as described above, and thus a detailed description thereof will be omitted.

When the above process is completed, the first sealing portion 121a of the exterior member 120 can be sealed, and the second sealing portion 121c of the exterior member 120 can be open. Thereafter, the second sealing portion 121c is sealed after the electrode assembly 110 and an electrolyte (not shown) are inserted into the exterior member 120, thereby completely manufacturing the secondary battery 100.

In this case, a method of sealing the second sealing portion 121c can be the same or similar as described above. For example, the second sealing portion 121c includes a third bonding portion 121c-1 and a fourth bonding portion 121c-2 that form both ends of the second sealing portion 121c. In this case, the third bonding portion 121c-1 and the fourth bonding portion 121c-2 are respectively the same or similar as the first and second bonding portions 121a-1 and 121a-2 described above, and thus, detailed descriptions thereof will be omitted.

The third and fourth bonding portions 121c-1 and 121c-2 can be thermal-bonded and connected to each other by folding one of these portions. A method of connecting these portions 121c-1 and 121c-2 is the same or similar as the method of connecting the first and second bonding portions 121a-1 and 121a-2 described above, and thus, a detailed description thereof will be omitted.

When the third and fourth bonding portions 121c-1 and 121c-2 are completely bonded as described above, the electrode assembly 110 and the electrolyte can be completely sealed by bonding the second sealing portion 121c in a lengthwise direction of the second sealing portion 121c. In this case, the first and second electrode tabs 112 and 114 which are connected to the electrode assembly 110 can penetrate the second sealing portion 121c, and can be partially exposed to the outside.

After the above process is completed, the secondary battery 100 can be variously formed. For example, the secondary battery 100 is formed by applying pressure to the secondary battery 100 disposed on a jig to have a curved surface of a predetermined radius of curvature or at least one radius of curvature.

When the above process is performed, external pressure can be directly applied to the exterior member 120 or internal pressure of the exterior member 120 can be increased due to the external pressure. In this case, the can portion 122 can provide rigidity in order to endure external pressure or an increase of the internal pressure. In addition, the pouch portion 121 provides elasticity, thereby preventing damage which can occur when the secondary battery 100 is modified.

Therefore, damage of the secondary battery 100 which can occur during a process of modifying the secondary battery 100 in various forms can be prevented. Also, since the secondary battery 100 can be modified by using small power, it is easy to manufacture the secondary battery 100 in various forms.

Figure 4:
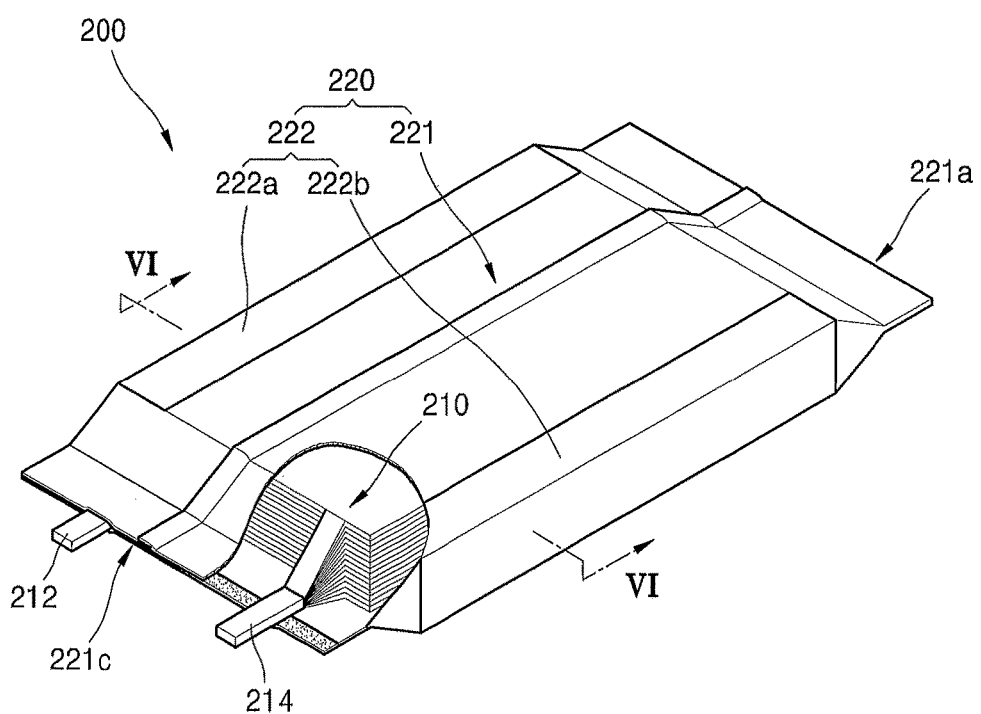
FIG. 4 is a perspective view of a secondary battery according to another embodiment.
Figure 5:
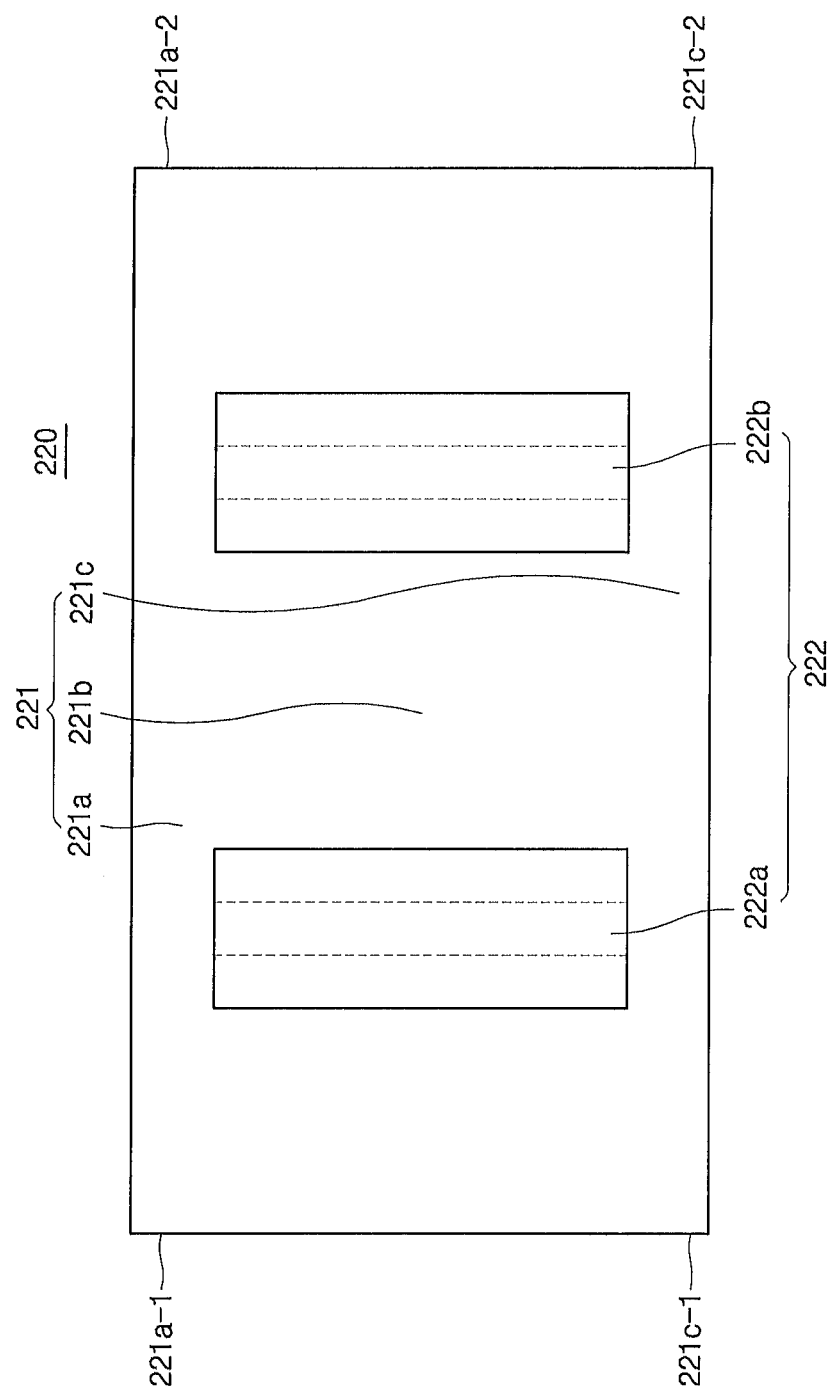
FIG. 5 is a development view of an exterior member of FIG. 4.
Figure 6:
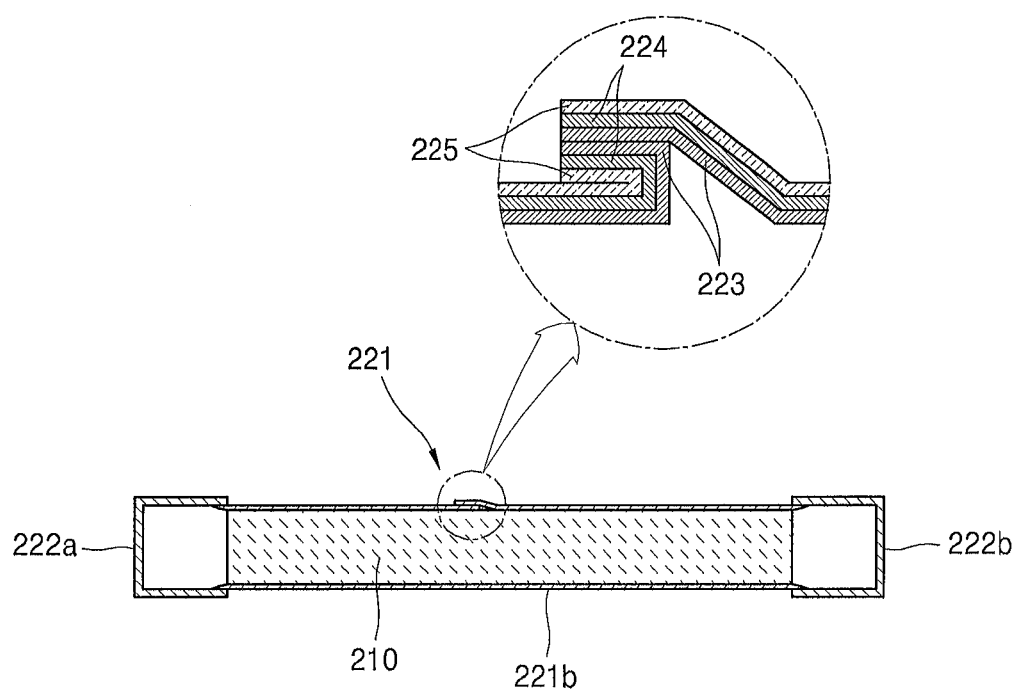
FIG. 6 is a cross-sectional view taken along a line IV-IV' of FIG. 4

FIG. 4 is a perspective view of a secondary battery 200 according to another embodiment. FIG. 5 is a development view of the exterior member 220 of FIG. 4. FIG. 6 is a cross-sectional view taken along a line IV-IV' of FIG. 4.

Referring to FIGS. 4 through 6, the secondary battery 200 includes an electrode assembly 210 and the exterior member 220. In this case, the electrode assembly 210 can be substantially the same as the electrode assembly 110 described with reference to FIGS. 1 through 3, and thus detailed descriptions of the electrode assembly 210 will be omitted.

The exterior member 220 can include a can portion 222 and a pouch portion 221. In this case, the can portion 222 and the pouch portion 221 are substantially the same as the can portion 122 and the pouch portion 121, and thus detailed descriptions of the can portion 222 and the pouch portion 221 will be omitted.

The number of pouch portions 221 can be one. In this case, the pouch portion 221 can be substantially rectangular. The pouch portion 221 can include a first sealing portion 221a, a pouch body 221b, and a second sealing portion 221c. Also, the first sealing portion 221a includes first and second bonding portions 221a-1 and 221a-2, and the second sealing portion 221c can include third and fourth bonding portions 221c-1 and 221c-2. The pouch portion 221 can also include metal layers 224 (See FIG. 6).

When a method of manufacturing the secondary battery 200 is examined, a first can portion 222a and a second can portion 222b can be bent. If the electrode assembly 210 is inserted into the first and second can portions 222a and 222b, the can portions 222a and 222b can be respectively arranged on sides of the electrode assembly 210.

When the above process is completed, the first and second sealing portion 221a and 221c can be thermal-bonded to each other. The first bonding portion 221a-1 of the first sealing portion 221a and the second bonding portion 221a-2 of the first sealing portion 221a are bonded to each other, and the third bonding portion 221c-1 of the second sealing portion 221c and the fourth bonding portion 221c-2 of the second sealing portion 221c can be bonded to each other. Also, both ends of the pouch body 221b can be bonded to each other. A method of bonding each of the above-listed components can be a method of bonding the first sealing portion 221a and the pouch body 221b to first insulating layers 223 of the second sealing portion 221c, or bonding the first sealing portion 221a and the pouch body 221b to second insulating layers 225 of the second sealing portion 221c, as described with reference to FIGS. 1 through 3.

When the above process is completed, the first sealing portion 221a is thermal-bonded and can seal a surface of the exterior member 220. In this case, a method of sealing the exterior member 220 is substantially the same as the above-described method, and thus a detailed description regarding the method will be omitted.

The electrode assembly 210 is inserted into the second sealing portion 221c which is open and then the electrolyte (not shown) is injected into the same. Then, the second sealing portion 221c is thermal-bonded. In this case, a first electrode tab 212 and a second electrode tab 214 penetrate the second sealing portion 221c, and portions thereof can be exposed to the outside.

When the above process is completed, the secondary battery 200 can be deformed by using a jig or the like. Pressure of diverse intensity or strength can be applied to the secondary battery 200. If the secondary battery 200 has a curved surface, pressure of varying intensity or strength can be applied to the secondary battery 200. In this regard, the can 222 has rigidity in order to endure the pressure or strength applied to the secondary battery 200, and the pouch portion 221 can provide elasticity to the secondary battery 200 when the secondary battery 200 is deformed.

Therefore, damage which can occur when the secondary battery 200 is variously deformed can be prevented. Also, since the secondary battery 200 can be deformed with low pressure, shapes of the secondary battery 200 can vary.

Figure 7:
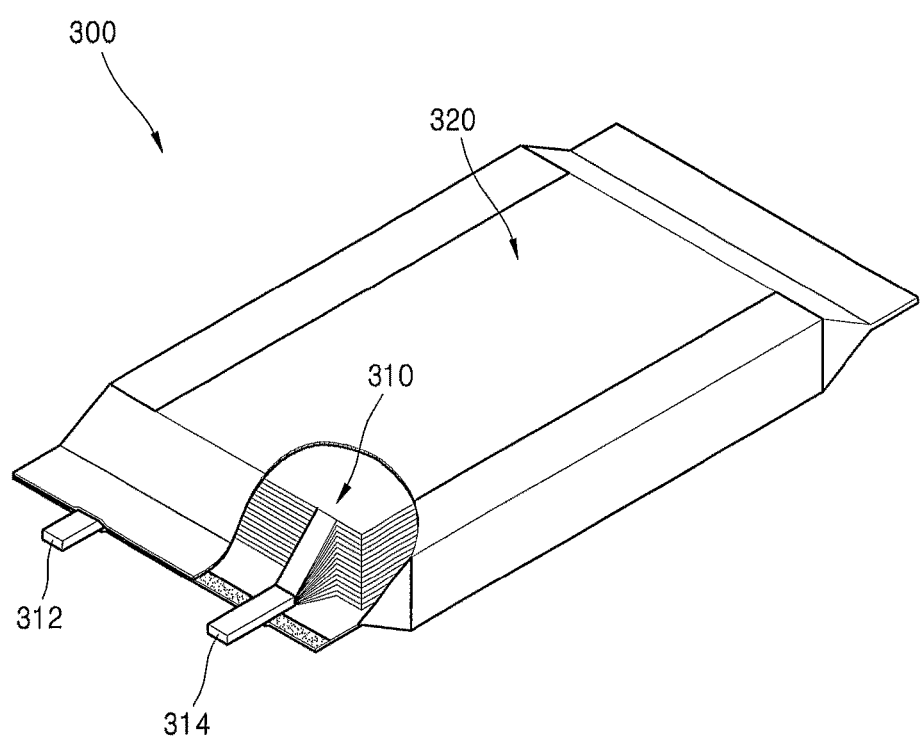
FIG. 7 is a perspective view of a secondary battery according to another embodiment.
Figure 8:
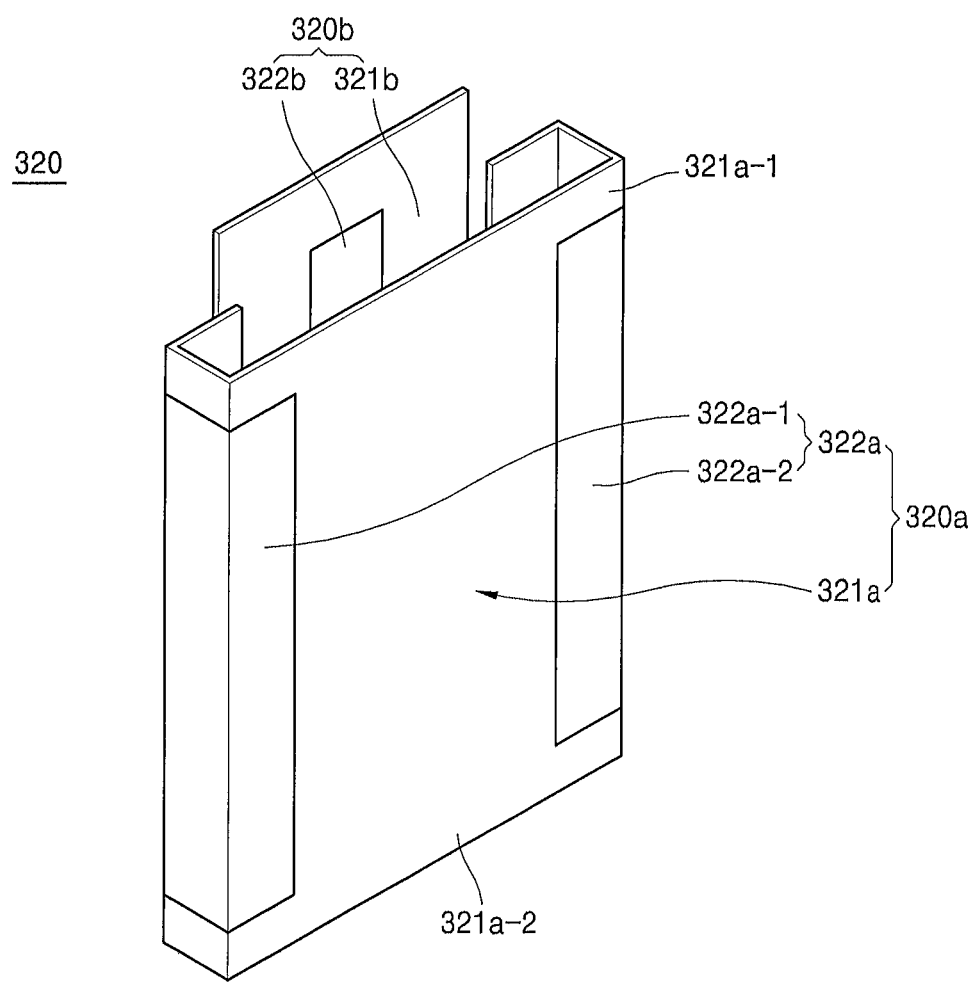
FIG. 8 is a development view of a first exterior member and a second exterior member of FIG. 7.

FIG. 7 is a perspective view of a secondary battery 300 according to another embodiment. FIG. 8 is a development view of a first exterior member 320a and a second exterior member 320b of FIG. 7.

Referring to FIGS. 7 and 8, the secondary battery 300 includes an exterior member 320 and an electrode assembly 310. In this case, the electrode assembly 310 is substantially the same as the electrode assembly 110 described with reference to FIGS. 1 through 3, and thus a detailed description regarding the electrode assembly 310 will be omitted.

The exterior member 320 can include the first exterior member 320a and the second exterior member 320b which are connected to each other and seal the electrode assembly 310. At least one of the first exterior member 320a and the second exterior member 320b can include a pouch portion (not shown) which is flexible and a can portion (not shown) which is connected to the pouch portion and is formed of a material having a greater hardness than the pouch portion. For example, only the first exterior member 320a includes the pouch portion and the can portion. As another example, only the second exterior member 320b includes the pouch portion and the can portion. As another example, both the first and second exterior members 320a and 320b include the pouch portion and the can portion. Hereinafter, however, a case where the first and second exterior members 320a and 320b including the pouch portion and the can portion will be described in detail for convenience.

As described above, the pouch portion can include first insulating layers (not shown), metal layers (not shown), and second insulating layers (not shown). In this case, the first insulating layers, the metal layers, and the second insulating layers are substantially the same as above, and thus detailed descriptions regarding the first insulating layers, the metal layers, and the second insulating layers will be omitted.

The first exterior member 320a can include a first pouch portion 321a and at least one can portion 322a. The number of can portions 322a can vary according to necessity, and hereinafter, a case where the can portion 322a includes a first can portion 322a-1 and a second can portion 322a-2 will be described in detail for convenience.

The second exterior member 320b can include a second pouch portion 321b or can include the second pouch portion 321b and at least one can portion 322b. The number of the can portions 322b can vary according to specific applications, which is substantially the same as the number of the first exterior member 320a. Hereinafter, the second exterior member 320b includes the second pouch portion 321b and the can portion 322b, and the can portion 322b of the second exterior member 320b will be referred to as a third can portion 322b for convenience.

The first pouch portion 321a and the second pouch portion 321b can have various shapes. For example, the first pouch portion 321a has substantially the same shape as the pouch portions 121 and 221 described with reference to FIGS. 1 through 6. Also, the second pouch portion 321b can have substantially the same shape as the pouch portions 121 and 221 described with reference to FIGS. 1 through 6. Hereinafter, for convenience, the first pouch portion 321a is the same as the pouch portion 121 described with reference to FIGS. 1 through 3, and the second pouch portion 321b is substantially rectangular which is similar to the shape of the pouch portion 221 described with reference to FIGS. 4 through 6.

As shown in FIGS. 1 through 3, the first pouch portion 321a, the first can portion 322a-1, and the second can portion 322a-2 are variously arranged. In this case, the first pouch portion 321a, the first can portion 322a-1, and the second can portion 322a-2 can be connected to each other, and the first can portion 322a-1 and the second can portion 322a-2 can be separated from each other. In some embodiments, the first pouch portion 321a can have various shapes such as a T shape, an '1' shape, or a substantially rectangular shape. Hereinafter, a case where the first pouch portion 321a has the substantially rectangular shape will be described in detail for convenience, but is not limited thereto.

The second pouch portion 321b and the third can portion 322b can also be variously arranged. For example, the second pouch portion 321b is substantially rectangular, and the third can portion 322b is inserted into a center of the second pouch portion 321b. Also, it is possible for the second pouch portion 321b to have a '[' shape and for the third can portion 322b to be arranged in an open area of the second pouch portion 321b. Hereinafter, a case where the second pouch portion 321b is substantially rectangular and the third can portion 322b is inserted into the center of the second pouch portion 321b will be described in detail for convenience, but they are not limited thereto.

When a method of manufacturing the secondary battery 300 is examined, the electrode assembly 310, the first exterior member 320a, and the second exterior member 320b can be manufactured first. In this case, a method of manufacturing the first exterior member 320a and the second exterior member 320b is substantially the same as the method described with reference to FIGS. 1 through 3, and thus a detailed description regarding the manufacturing method of manufacturing the first exterior member 320a, and the second exterior member 320b will be omitted.

When the above process is completed, the first exterior member 320a and the second exterior member 320b can be thermal-bonded to each other. In some embodiments, both ends of the first pouch portion 321a are bonded to those of the second pouch portion 321b. In this case, as shown in FIG. 7, the first can portion 322a-1 and the second can portion 322a-2 can be curved, and a method of curving the first can portion 322a-1 and the second can portion 322a-2 is substantially the same as above.

As described above, when the ends of the first pouch portion 321a are respectively bonded to the ends of the second pouch portion 321b, the method of bonding the ends of the first pouch portion 321a to those of the second pouch portion 321b can be substantially the same as the method of bonding the first bonding portion 121a-1 to the second bonding portion 121a-2. In some embodiments, ends of one of the first pouch portion 321a and the second pouch portion 321b are bent and contact ends of the other one of the first pouch portion 321a and the second pouch portion 321b. Then, the ends of the first pouch portion 321a and the second pouch portion 321b are thermal-bonded to each other.

When the above process is completed, a first sealing portion 321a-1 of the first pouch portion 321a can be attached to the second pouch portion 321b and then sealed. In this case, a second sealing portion 321a-2 of the first pouch portion 321a is open, and thus an open area of the exterior member 320 can be formed.

After the electrode assembly 310 is inserted into the open area of the exterior member 320, the second sealing portion 321a-2 of the first pouch portion 321a and the second pouch portion 321b are thermal-bonded and then completely sealed. A first electrode tab 312 and a second electrode tab 314 can be exposed to the outside through a gap between the second sealing portion 321a-2 and the second pouch portion 321b.

When the secondary battery 300 is completed as described above, the first can portion 322a-1 and the second can portion 322a-2 can form a side of the secondary battery 300. Also, the third can portion 322b can form a center of the secondary battery 300.

When the secondary battery 300 is deformed due to external strength, the first can portion 322a-1 through the third can portion 322b can endure external strength or external pressure which is applied when the secondary battery 300 is deformed. In some embodiments, when the secondary battery 300 is curved, the third can portion 322b prevents the secondary battery 300 from restoring its shape after the deformation, and thus the shape of the secondary battery 300 is maintained.

When the external strength or external pressure is applied to the first pouch portion 321a and the second pouch portion 321b, elasticity or a restoring force with regard to internal pressure applied by at least one of the electrolyte (not shown) in the exterior member 320 and the electrode assembly 310 can be provided.

Therefore, damage which can occur when the secondary battery 300 is variously deformed can be prevented. Also, since the secondary battery 300 can be deformed with low pressure, shapes of the secondary battery 300 can vary.

As described above, according to at least one of disclosed embodiments, a shape of a secondary battery is easily changed and the secondary battery has rigidity.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details can be made therein without departing from the spirit and scope as defined by the following claims.

What is claimed is:

1. A secondary battery comprising:
an electrode assembly; and
an exterior member accommodating the electrode assembly,
wherein the exterior member comprises:
a flexible pouch portion; and
a can portion connected to the pouch portion and formed of a material having a greater hardness than that of the pouch portion,
wherein the pouch portion defines at least one opening that is configured to expose the electrode assembly, wherein the can portion is inserted into or receives the pouch portion to close the opening and seal the electrode assembly, wherein the can portion has a first surface facing the electrode assembly and a second surface opposite to the first surface, wherein a portion of the pouch portion contacts one of the first surface of the can portion or the second surface of the can portion, and wherein the electrode assembly includes an electrode tab that is exposed to the outside of the exterior member through the flexible pouch portion.

2. The secondary battery of claim 1, wherein the pouch portion and the can portion are thermally bonded to each other.

3. The secondary battery of claim 1, wherein the can portion forms at least one of the side surfaces of the exterior member.

4. The secondary battery of claim 2, wherein the can portion is bent so as to surround the side surfaces of the electrode assembly.

5. The secondary battery of claim 1, wherein the can portion is located in a center portion of the exterior member.

6. The secondary battery of claim 1, wherein the exterior member is curved.

7. The secondary battery of claim 1, wherein the pouch portion comprises:
a first sealing portion;
a pouch body connected to the first sealing portion; and
a second sealing portion facing the first sealing portion and connected to the pouch body.

8. The secondary battery of claim 7, wherein each of the first and second sealing portions is connected to the pouch body in a lengthwise direction of the pouch body.

9. The secondary battery of claim 7, wherein a width of the first sealing portion is different from a width of the pouch body.

10. The secondary battery of claim 9, wherein the width of the first sealing portion is greater than the width of the pouch body.

11. The secondary battery of claim 7, wherein the can portion is arranged in a space formed by the first and second sealing portions and the pouch body, and wherein the can portion is connected to the first and second sealing portions and the pouch body.

12. The secondary battery of claim 11, wherein at least one end of each of the first and second sealing portions protrudes from an end of the can portion.

13. The secondary battery of claim 7, wherein the can portion comprises a plurality of can portions, and wherein the can portions are spaced apart from each other and connected to the pouch body.

14. A secondary battery comprising:
an electrode assembly; and
an exterior member comprising first and second exterior members connected to each other and accommodating the electrode assembly,
wherein the first exterior member comprises:
a first flexible pouch portion; and
a first can portion and a second can portion connected to the first pouch portion and formed of a material having a greater hardness than the first pouch portion,
wherein the second exterior member comprises:
a second flexible pouch portion connected to the first pouch portion; and
a third can portion,
wherein the second pouch portion defines at least one opening that is configured to expose the electrode assembly, and wherein the third can portion closes the opening of the second pouch portion.

15. The secondary battery of claim 14, wherein the first and second can portions form opposing sides of the first exterior member.

16. The secondary battery of claim 14, wherein the third can portion is located at the center of the second exterior member.

17. The secondary battery of claim 14, wherein the first exterior member is curved.

18. The secondary battery of claim 14, wherein the at least one opening comprises two or more openings.

19. The secondary battery of claim 14, wherein the pouch portion includes a pair of long sides opposing each other and a pair of short sides opposing each other, and wherein the at least two openings are defined in the long sides.

20. The secondary battery of claim 14, wherein the pouch portion comprises:
a first sealing portion;
a pouch body connected to the first sealing portion; and
a second sealing portion facing the first sealing portion and connected to the pouch body,
wherein the can portion, the first and second sealing portions, and the pouch body are connected to each other to be positioned on the same plane.

21. The secondary battery of claim 20, wherein the can portion is perpendicular to the first and second sealing portions.

22. A secondary battery comprising:
an electrode assembly; and
an exterior member accommodating the electrode assembly, wherein the exterior member comprises:
a flexible pouch portion accommodating a middle portion of the electrode assembly; and
a can portion connected to the pouch portion and accommodating side portions of the electrode assembly, wherein the can portion is formed of a material having a greater hardness than that of the pouch portion,
wherein the pouch portion defines at least one opening that is configured to expose the electrode assembly, wherein the can portion is inserted into or receives the pouch portion to close the opening and seal the electrode assembly,
wherein the can portion has a first surface facing the electrode assembly and a second surface opposite to the first surface,
wherein a portion of the pouch portion contacts one of the first surface of the can portion or the second surface of the can portion, and
wherein the electrode assembly includes an electrode tab that is exposed to the outside of the exterior member through the flexible pouch portion.

* * * * *